(12) United States Patent
Singer

(10) Patent No.: US 7,022,756 B2
(45) Date of Patent: Apr. 4, 2006

(54) METHOD OF MANUFACTURING COMPOSITE BOARD

(75) Inventor: Larry Singer, Boca Raton, FL (US)

(73) Assignee: Mill's Pride, Inc., Waverly, OH (US)

( * ) Notice: Subject to any disclaimer, the term of this patent is extended or adjusted under 35 U.S.C. 154(b) by 218 days.

(21) Appl. No.: 10/410,979

(22) Filed: Apr. 9, 2003

(65) Prior Publication Data

US 2004/0202857 A1    Oct. 14, 2004

(51) Int. Cl.
C08L 97/02    (2006.01)
C08L 1/02     (2006.01)

(52) U.S. Cl. .......................................... 524/14; 524/13
(58) Field of Classification Search ............. 524/13–14
See application file for complete search history.

(56) References Cited

U.S. PATENT DOCUMENTS

| | | | |
|---|---|---|---|
| 3,283,048 A * | 11/1966 | Hoppeler | 264/113 |
| 3,965,056 A * | 6/1976 | Stout et al. | 524/14 |
| 4,405,744 A | 9/1983 | Greinecker et al. | |
| 5,134,023 A | 7/1992 | Hsu | |
| 5,432,000 A | 7/1995 | Young, Sr. et al. | |
| 5,445,878 A | 8/1995 | Mirous | |
| 5,543,215 A | 8/1996 | Hansen et al. | |
| 5,626,939 A | 5/1997 | Kotlair et al. | |
| 5,629,083 A | 5/1997 | Teodorczyk | |
| 5,952,410 A | 9/1999 | Yokoyama et al. | |
| 5,955,023 A | 9/1999 | Ioffe et al. | |
| 6,294,117 B1 | 9/2001 | Rosthauser et al. | |
| 6,306,251 B1 | 10/2001 | Jewell et al. | |
| 6,344,504 B1 | 2/2002 | Zehner et al. | |
| 6,379,814 B1 | 4/2002 | Dupre et al. | |
| 6,391,456 B1 | 5/2002 | Krishnaswamy et al. | |
| 6,414,066 B1 | 7/2002 | Lem et al. | |
| 6,461,553 B1 | 10/2002 | Hansen et al. | |
| 6,498,205 B1 | 12/2002 | Zehner | |

* cited by examiner

Primary Examiner—Peter Szekely
(74) Attorney, Agent, or Firm—Carlson, Gaskey & Olds

(57) ABSTRACT

A composite board is made from waste medium density fiber (MDF) board or waste particle board that includes solid urea formaldehyde. The waste board is chopped and milled into particles having a size between 20 mesh and 150 mesh, creating a waste flour. After removing moisture from the waste flour, the dried waste flour is mixed with a thermoplastic to bind and encapsulate the waste flour. Internal lubricants are added to improve the flow characteristics of the blended material, and external lubricants are added to present sticking of the mixture to an extruder or mold. Mineral fillers are added to improve the flexural modules of the composite board, and a plasticizer can be added to improve the physical properties or mechanical characteristics of the mixture. An ultraviolet absorber, a biocide, and a pigment can also be added. The blended material is extruded or molded into a desired shape. When cooled, the thermoplastic hardens to form a solid composite board.

25 Claims, 1 Drawing Sheet

METHOD OF MANUFACTURING COMPOSITE BOARD

BACKGROUND OF THE INVENTION

The present invention relates generally to a method of manufacturing composite board by mixing wood particles and particles of solid urea formaldehyde together with a bonding agent to form the composite board.

Man made composite boards are made from wood and have the features of natural wood. When manufacturing composite boards, such as medium density fiber (MDF) boards or particle boards, wood is first ground into wood chips of a desired size. In one prior art composite board, the wood chips are then mixed with liquid urea formaldehyde in a blender until uniformly blended. Urea formaldehyde is a thermoset plastic. The homogenized mixture is then extruded or molded into a desired shape. The urea formaldehyde cross-links in the mixture, hardening and solidifying the composite board. The composite board can be coated with polyvinyl chloride (PVC), melamine, metal, foil, impregnated paper, wood veneer that is stained and sealed or polyester to make the composite board decorative and wear resistant and to provide other properties. The hardened composite board is then cut to a desired shape and size, and then further processed by cutting, drilling, or edging to create a component part. The composite boards can be used as cabinets, molding, storage units, desks, or other products.

When composite boards including urea formaldehyde are discarded, they are usually thrown away or burnt and not recycled. In recent years, recycling has become of increased importance due to limited landfill capacity and an increase in environmental awareness. If the composite board is burnt, harmful gases are released into the atmosphere. A drawback to the prior art composite board is that the discarded composite boards are not recycled, increasing the amount of material collected and discarded in landfills and the amount of pollution released into the atmosphere.

Hence, there is need in the art for a method of manufacturing composite board from waste material board including solid urea formaldehyde.

SUMMARY OF THE INVENTION

The composite board of the present invention is made from waste material, such as medium density fiber (MDF) board or particle board, that includes solid urea formaldehyde and other impurities. The waste material is chopped into particles approximately one inch in size. The chopped particles are then ground into smaller particles having a size between 1/8 of an inch and 1/4 of an inch. The ground particles are then milled into smaller particles having a size between 150 mesh and 20 mesh. The urea formaldehyde is in the solid state in the waste MDF board, and therefore the wood reducing process also chops the urea formaldehyde into smaller particles of solid urea formaldehyde. The impurities are also chopped into smaller particles. Sawdust waste is also created by the wood reducing process, combining with the milled particles to form waste flour. After reducing the size of the waste material particles, a dryer removes moisture from the waste flour to reduce the moisture content of the waste flour to less than one half of 1%.

The dried waste flour is then added to a blender and mixed with other materials to form a homogeneous mixture. Thermoplastic is added to bind and encapsulate the waste flour. Internal lubricants are added to improve the flow characteristics of the blended material, and external lubricants are added to prevent the blended material from sticking to an extruder or mold. Mineral fillers are also added to increase the flexural modulus of the finished product and to fill in the voids between the waste flour particles. A plasticizer can also be added to improve the physical properties or mechanical characteristics of the mixture. An ultraviolet absorber, a biocide, and a pigment can also be added.

Preferably, the uniformly blended material includes approximately 40–70% waste flour, approximately 30–50% thermoplastic, approximately 1–3% lubricants, approximately 3–12% mineral fillers, and approximately 0.05–3% plasticizers, ultraviolet absorber, biocide, and pigment.

After thorough mixing, the blended material is extruded or molded into a desired shape. The thermoplastic in the mixture cools and hardens to solidify the composite board. The composite board is then cut or machined to a desired size and shape.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
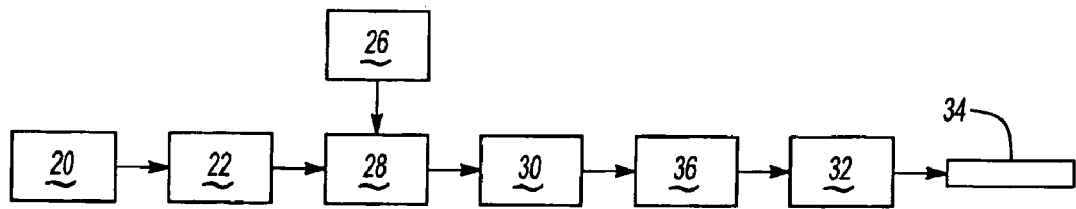
FIG. 1 schematically illustrates a prior art method of forming a medium density fiber (MDF) board or particle board.

FIG. 1 schematically illustrates a prior art method of manufacturing a medium density fiber (MDF) board or particle board 34. Wood 20 is first ground into wood chips of a desired size in a wood reducer 22. After grinding, the wood chips are mixed with liquid urea formaldehyde 26 in a blender 28 to form a uniform mixture. Urea formaldehyde is a thermoset resin. The homogenized mixture is then molded or extruded 30 into a desired shape. The urea formaldehyde cross-links in the mixture, hardening the mixture into a solid board. The board can then be coated 36 with polyvinyl chloride (PVC), melamine, metal, foil, impregnated paper, wood veneer that is stained and sealed, or polyester to make the board 34 decorative and wear resistant and to provide other properties. The board is then cut to a desired shape and size in a sizer 32. The board 34 includes approximately 8–15% urea formaldehyde by weight. The board 34 can be used as cabinets, molding, deck boards, storage units, desks, or any other product.

When the board 34 is no longer to be used, the waste board 34 is used to create the composite board 72 of the present invention, rather than being discarded and thrown away or burned.

Figure 2:
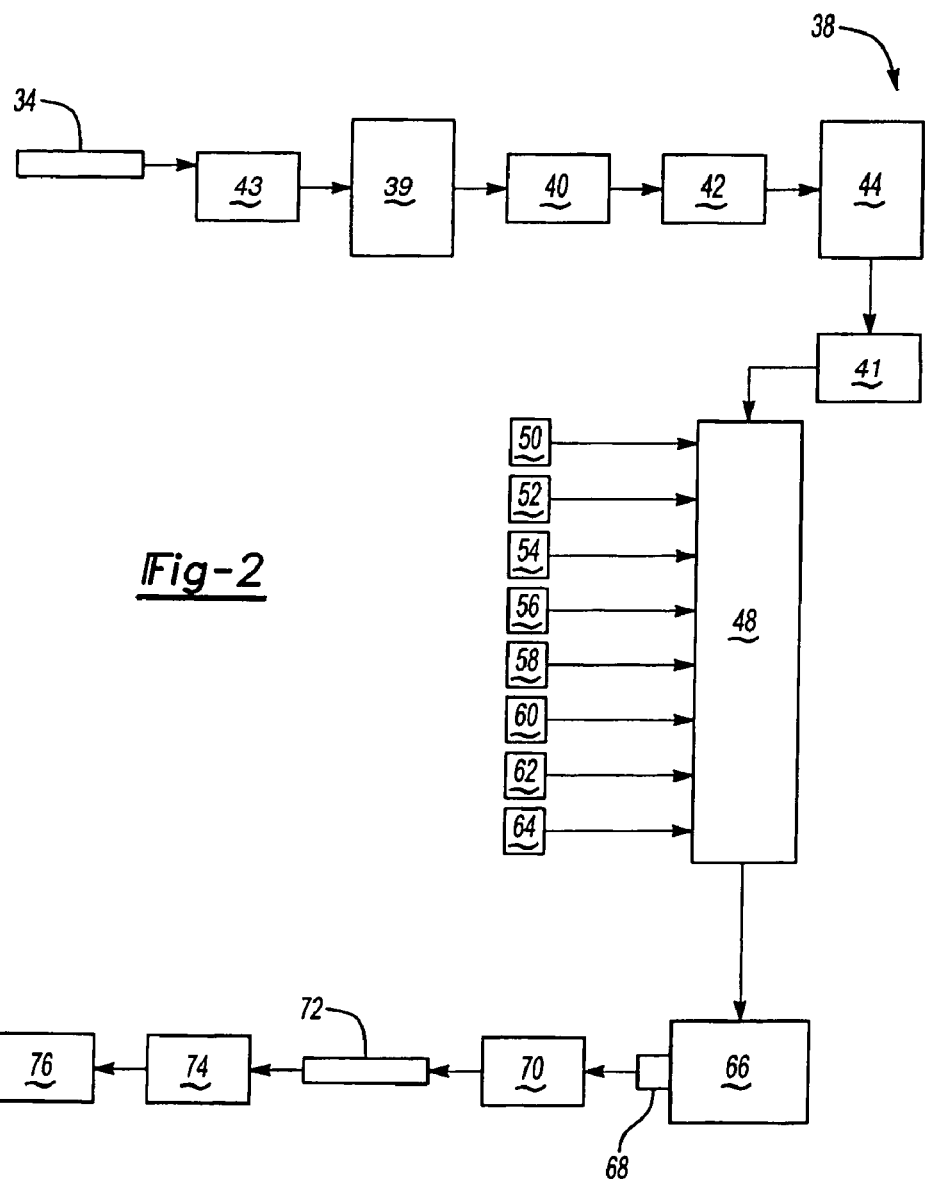
FIG. 2 schematically illustrates a diagram of an assembly for manufacturing the composite board of the present invention.

FIG. 2 schematically illustrates an assembly 38 for manufacturing the composite board 72 of the present invention. The waste board 34 is chopped in a hog 43 into chopped particles having a size of approximately one inch. During chopping, sawdust waste of different sizes is created. The hog 43 also chops the coating 36 (shown in FIG. 1) applied on the board 34, creating impurities. After chopping, the chopped particles and the sawdust waste 24 are stored in a silo 39, until needed.

The one inch particles are then milled by a first wood reducer 40 to form smaller particles having a size between ⅛ of an inch and ¼ of an inch. The first wood reducer 40 can be a miller, or other equivalent wood reducer. The miller particles are then milled into smaller particles having a size between 150 mesh and 20 mesh in a second wood reducer 42. The second wood reducer 42 can be a miller or other equivalent wood reducer. The sawdust waste and the impurities can have a size smaller than 150 mesh. The combined sawdust waste, impurities, and the milled particles form a waste flour. The urea formaldehyde in the waste board 34 is in a solid state, and therefore the wood reducing steps also chop the urea formaldehyde into smaller particles of solid urea formaldehyde. The waste flour is stored in a holding accumulator 44 until needed.

Alternately, the waste flour is created by wood particles and solid urea formaldehyde to create a mixture of wood particles and chopped solid urea formaldehyde. It should be understood that the wood particle used to create the waste flour can also be manufactured directly from virgin wood trees and other natural sources.

The waste flour has a moisture content between 7–15%. A dryer 41 removes moisture in the waste flour. After drying, the combined waste flour preferably has a moisture content of less than one half of 1%. The moisture content of the waste flour must be kept low. If the moisture content is too high, the moisture will boil away when the waste flour is later mixed with the thermoplastic 50, creating voids that weaken the composite board 72.

The dried waste flour is then added to a blender 48 for mixing with other materials. Thermoplastic 50 is added to the blender 38 to bind and ecapsulate the waste flour. Preferably, the thermoplastic is virgin high density polyethylene. However, the thermoplastic can also be low density polyethylene, polypropylene, polyvinyl chloride, impact co-polymer polypropylene or styrene acrylonitril. The thermoplastic can also be reground/recycled thermoplastic or a blend of virgin thermoplastic and reground/recycled thermoplastic. One skilled in the art would know what thermoplastic to employ.

Lubricants are also added to the blender 48. Internal lubricants 52 are added to improve the flow characteristics of the blended material, and external lubricants 54 are added to prevent sticking of the blended material during extrusion from an extruder 66 or molding. In one example, the internal lubricant 52 is ethylene bis-steramide, and the external lubricant is zinc stearate or calcium stearate. However, any material that provides a lubricant function can be employed, and one skilled in the art would know what lubricants to employ.

Mineral fillers 56 are also added to the blender 48. The mineral fillers 56 are very fine, combining with the mixture to improve the flexural modulus and stiffness of the composite board 72. The mineral fillers also fill in the voids between the waste flour particles. Preferably, talc (magnesium silicate) is the mineral filler. Alternately, calcium carbonate and aluminum tri-hydrate can also be employed as the mineral filler. If the mineral filler 56 is aluminum tri-hydrate, the composite board 72 is flame retardant and has increased corrosion resistance.

A plasticizer 58 can be added to the blender 48 to improve the physical properties or mechanical characteristics of the composite board 72. If the thermoplastic 50 is polyvinyl chloride, a plasticizer 58 is needed to provide these characteristics. In one example, the plasticizer is diocytl phthalate.

An ultraviolet absorber 60, a biocide 62, and a pigment 64 can also be added to the mixture in the blender 48. The ultraviolet absorber 60 is used to absorb ultraviolet light. In one example, the ultraviolet absorber 60 is Tinuvin 770 manufactured by Ciba. The biocide 62 is employed to prevent rotting and to resist fungal attaches. In one example, the biocide 62 is Poly Alpha BN manufactured by Towa Chemical or lonepure manufactured by Wells Plastics LTD. The pigment 64 is employed to provide color. Titanium dioxide or zinc sulfide can be employed as the pigment 64 to provide a white color. Red iron oxide can be employed as the pigment 64 to provide a red color. Black iron oxide or carbon black can be employed as the pigment 64 to provide a black color. Zinc ferrite can be employed as the pigment 64 to provide a yellow color. Manganese ferrite can be employed as the pigment 64 to provide a brown color.

The waste flour, thermoplastic 50, internal lubricant 52, external lubricant 54, mineral filler 56, plasticizer 58, ultraviolet absorber 60, biocide 62, and pigment 64 are mixed in the blender 48 to form a homogenously blended material.

Preferably, the uniformly blended material includes approximately 40–70% waste flour, approximately 30–50% thermoplastic 50, approximately 1–3% lubricant 52 and 54, approximately 3–12% mineral filler 56, and approximately 0.05–3% plasticizer 58, ultraviolet absorber 60, biocide 62, and pigment 64. In one example, the mixture includes 58% waste flour, 31% high density polyethylene (thermoplastic), 8% talc (mineral filler), 2% zinc stearate (external lubricant), and 1% ethylene bis-stearamide (internal lubricant).

The blended material is transferred to an extruder 66 and heated to approximately 300–450° F. to melt the thermoplastic 50. The melted material is then extruded through a die 68 into a desired shape. Alternately, the blended material can be heated and formed into a desired shape by injection molding or compression molding. The thermoplastic 50 in the mixture hardens and cools in a cooling tank 70 to solidify the mixture and form the composite board 72. The hardened composite board 72 is then cut or machined to a desired size and shape in a cutter or machine 74. The composite board 72 can also be run through a die to create texture on the surface of the composite board 72. The composite board 72 can be coated 76 with polyvinyl chloride (PVC), melamine, metal, foil, impregnated paper, wood veneer, or polyester. Finally, the composite board 72 is packaged 78 for shipping to a customer. The composite board 72 of the present invention can be used to make cabinets, molding, deck board, storage units, desks, building products, such as shingles, or any other product that uses composite boards. The composite board 72 can also be used in interior application or exterior applications.

The waste board 34 used to create the composite board 72 can include trace amount of impurities from the coating 36 of polyvinyl chloride, melamine or metals applied on the waste board 34. The impurities can be aluminum, antimony, arsenic, barium, beryllium, cadmium, calcium, chromium, cobalt, copper, iron, lead, magnesium, manganese, mercury, molybdenum, nickel, selenium, silver, sodium, strontium, tin, vanadium or zinc. The impurities can also be benzene, carbon tetrachloride, chlorobenzene, chloroform, o-cresol, m-cresol, p-cresol, 1,4-dichlorobenzene, 1,2-dichloroethane, 1,1-dichoroehtylene, 2,4-dinitrotoluene, hexachlorobenzene, hexachloro-1,3-butadiene, hexachloroethance, methyl ethyl ketone, nitrobenzene, pentachlorophenol, pyridine, tetrachloroethylene, trichloroethylene, 2,4,5-trichlorophenol, or 2,4,6-trichlorophenol.

There are several advantages to the composite board 72 of the present invention. For one, the waste board 34 is recycled and not thrown away, reducing the amount of material thrown into landfills. The waste board 34 is also not burned, reducing air pollution. Additionally, the composite board 72 has improved physical properties and is resistant to water absorption. The solid urea formaldehyde in the waste flour improves tensile and flexural strength of the composite board 72. The waste flour and the solid particles of urea formaldehyde in the composite board 72 are encapsulated in the thermoplastic 50, reducing rotting of the composite board 72 and allowing the composite board 72 to be used in exterior applications. The composite board 72 is not treated to with chromated copper arsenate to prevent rotting, which is an environmental and health hazard.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A composite material comprising:
   a plurality of particles, each, particle of said plurality of particles including both wood and solid urea formaldehyde;
   a mineral filler mixed with said plurality of particles; and
   a thermoplastic bonding agent that bonds said plurality of particles to form a composite material.

2. The composite material as recited in claim 1 wherein the composite material includes approximately 50–70% of said plurality of particles, approximately 30–50% of said bonding agent, approximately 1–3% of a first lubricant and a second lubricant, approximately 3–12% of a mineral filler, and approximately 0.05–3% of a plasticizer.

3. The composite material as recited in claim 1 wherein said wood is virgin wood.

4. The composite material as recited in claim 1 wherein said plurality of particles includes 8–15% of said solid urea formaldehyde by weight.

5. The composite material as recited in claim 1 wherein said plurality of particles have a size from approximately 150 mesh and 20 mesh.

6. The composite material as recited in claim 1 wherein said bonding agent is one of high density polyethylene, low density polyethylene, polypropylene, polyvinyl chloride, impact co-polymer polypropylene, or styrene acrylonitril.

7. The composite material as recited in claim 1 further including a first lubricant and a second lubricant mixed with said plurality of particles.

8. The composite material as recited in claim 7 wherein said first lubricant is zinc stearate and said second lubricant is ethylene bis-steramide.

9. The composite material as recited in claim 1 wherein said mineral filler is one of magnesium silicate, calcium carbonate, or aluminum tri-hydrate.

10. The composite material as recited in claim 1 further including a plasticizer mixed with said plurality of particles.

11. The composite material as recited in claim 1 including at least one of an ultraviolet absorber, a biocide, or a pigment mixed with said plurality of particles.

12. A panel formed from the composite material of claim 1.

13. A composite material comprising:
    a plurality of particles including both wood and solid urea formaldehyde;
    a thermoplastic bonding agent that bonds said plurality of particles;
    a first lubricant and a second lubricant mixed with said plurality of particles;
    a mineral filler mixed with said plurality of particles; and
    a plasticizer mixed with said plurality of particles.

14. The composite method as recited in claim 13 wherein said wood is virgin wood.

15. The composite material as recited in claim 13 wherein said bonding agent is one of high density polyethylene, low density polyethylene, polypropylene, polyvinyl chloride, impact co-polymer polypropylene, or styrene acrylonitril.

16. The composite material as recited in claim 13 wherein said first lubricant is zinc stearate and said second lubricant is ethylene bis-steramide.

17. The composite material as recited in claim 13 wherein said mineral filler is one of magnesium silicate, calcium carbonate, or aluminum tri-hydrate.

18. The composite material as recited in claim 13 further at least one of an ultraviolet absorber, a biocide, or a pigment mixed with said plurality of particles.

19. The composite material as recited in claim 13 wherein the composite material includes approximately 50–70% of said plurality of particles, approximately 30–50% of said bonding agent, approximately 1–3% of said first lubricant and said second lubricant, approximately 3–12% of said mineral filler, and approximately 0.05–3% of said plasticizer.

20. The composite material as incited in claim 12 wherein the panel includes a coating.

21. The composite material as recited in claim 20 wherein the coating includes a material of a group consisting of polyvinyl chloride, melamine, meal, foil, impregnated paper, polyester, veneer, or combination thereof.

22. The compose material as recited in claim 12 wherein said panel is from a consumer recycle stream.

23. The composite material as recited in claim 22 wherein said panel is from a consumer recycle stream consisting of cabinets, molding, deck boards, storage units, desks, or combinations thereof.

24. A composite material comprising:
    a plurality of particles formed from a chopped composite wood panel, wherein the chopped composite wood panel comprises at least wood, solid urea formaldehyde and a veneer; and
    a thermoplastic bonding agent that bonds said plurality of particles to form a composite material.

25. A composite material comprising:
    a mixture of wood particles and solid urea formaldehyde particles;
    a mineral filler mixed with said mixture; and
    a thermoplastic bonding agent that bonds said wood particles, said solid urea formaldehyde particles, and said mineral filler together to form a composite material.

* * * * *